(12) United States Patent
Pieschel et al.

(10) Patent No.: US 6,703,496 B1
(45) Date of Patent: Mar. 9, 2004

(54) STARCH PHOSPHATES, METHOD FOR THE PRODUCTION THEREOF AND THEIR USE

(75) Inventors: Friedemann Pieschel, Wolfen (DE); Eckehard Lange, Köthen (DE); Juan Camacho, Jena (DE)

(73) Assignee: Helmut Körber, Halle/S. (DE)

( * ) Notice: Subject to any disclaimer, the term of this patent is extended or adjusted under 35 U.S.C. 154(b) by 0 days.

(21) Appl. No.: 09/868,812

(22) PCT Filed: Dec. 20, 1999

(86) PCT No.: PCT/EP99/10134

§ 371 (c)(1),
(2), (4) Date: Aug. 8, 2001

(87) PCT Pub. No.: WO00/37505

PCT Pub. Date: Jun. 29, 2000

(30) Foreign Application Priority Data

Dec. 21, 1998 (DE) .......................... 198 59 123

(51) Int. Cl.$^7$ .................. C08B 31/00; C08B 31/06; C08B 33/00; C08B 33/02; C08B 35/00
(52) U.S. Cl. .................. 536/45; 536/48; 536/53
(58) Field of Search ................... 536/45, 48, 53

(56) References Cited

U.S. PATENT DOCUMENTS 3,843,377 A * 10/1974 Alexander ............... 106/157
4,083,904 A    4/1978 Sano et al.

FOREIGN PATENT DOCUMENTS

| BE | 618 620 | 10/1962 |
|---|---|---|
| ES | 8 401 769 | 3/1984 |
| GB | 968 427 | 9/1964 |

OTHER PUBLICATIONS

Waly et al. (1994) "Synthesis and Properties of Starch Phosphate Monoesters", *Starch/Starke* vol. 46, No. 2, pp. 59–63.

* cited by examiner

*Primary Examiner*—James O. Wilson
*Assistant Examiner*—Everett White
(74) *Attorney, Agent, or Firm*—Collard & Roe, P.C.

(57) ABSTRACT

The invention relates to starch phosphates exhibiting improved properties with regard to application techniques, to a method for the production thereof, and to their use. Based on the disadvantages of the known prior art, the aim of the invention is to produce starch phosphates which have a high degree of substitution, which are resistant to hydrolysis, and which can be produced using phosphorylating agents comprising only a low level of toxicity. To this end, starch phosphates are provided in which the anhydroglucose units are substituted by phosphate ester groups and carbamide groups, and the average degree of substitution DS of the carbamide groups and of the phosphate ester groups is in a range, each time, that is greater than 0.01. The starting materials are used in a mol ratio of anhydroglucose units of the starch:phosphorus of the phosphorylating agent:urea of 1:0.1 to 1.5:0.3 to 4, and the reaction is carried out in a vacuum under a pressure of $\leq 100$ torr and at reaction temperatures ranging from 90° C. to 140° C. Starch phosphates exhibiting different properties are obtained by reacting at different reaction temperatures, are distinguished by a good biodegradability, and are resistant to hydrolysis under normal conditions.

12 Claims, No Drawings

STARCH PHOSPHATES, METHOD FOR THE PRODUCTION THEREOF AND THEIR USE

CROSS REFERENCE TO RELATED APPLICATIONS

Applicants claim priority under 35 U.S.C. §119 of German Application No. 198 59 123.3 filed Dec. 21, 1998. Applicants also claim priority under 35 U.S.C. §365 of PCT/EP99/10134 filed Dec. 20, 1999. The international application under PCT article 21(2) was not published in English.

BACKGROUND OF THE INVENTION

1. Field of the Invention

The invention relates to starch phosphates with enhanced properties in regard to application techniques; to a method for the production of such starch phosphates; as well as to their use. Starch phosphates are starch derivatives in which at least some of the available hydroxy-groups of the polysaccharide are esterified with phosphate ester groups with or without cross-linking of the polysaccharide. Non-cross-linked monoesters and cross-linked diesters of the starch are obtained depending on the phosphorylating agents as employed and the conditions of the reaction.

2. The Prior Art

Only starch phosphates with low degrees of substitution have gained technical significance until now.

GB-A 968 427 describes the reaction of corn starch with 0.135 mol $NaH_2PO$ and 0.27 mol urea each per equivalent of anhydroglucose, at a vacuum of 77.860 kPa and a temperature of up to 138° C. over a time duration of 3 hours. In said process, a water-containing suspension with 45% starch is used as the starting material, which, after adding the other two reaction components, is filtrated prior to the thermal treatment, whereby substantial amounts of urea and phosphate are jointly separated. For that reason, only a starch phosphate with low degrees of substitution of the carbamide and phosphate ester groups is obtained, which in each case amounts to below about 0.07.

In the literature, WALY ET AL, Starch 46 [1994], No. 2, pages 59 to 63, describes among other things the reaction of 50 g starch with 5 g $H_3PO_4$ and 2 g urea at a temperature of 155° C. over a time duration of 2 hours. Because of the low amount of urea used, the latter only serves as a condensing agent in the reaction, so that no formation of carbamide groups can occur, or occur only to a minor degree.

ES-A-8,401,769 describes a reaction of 65 g starch with 25 g urea and 10 g phosphoric acid, at 150° C. over a time of 45 minutes. A starch phosphate is formed as a result of the relatively high proportions of urea and phosphoric acid, because the reaction is carried out at a high temperature and without a vacuum. The starch phosphates so obtained are insoluble products with little swelling power.

It is also from the literature (Houben-Weyl [1987], volume 20/3, page 2164) that the esterification reaction for forming the starch phosphates can be favorably influenced by adding organic nitrogen compounds such as, for example urea. In the specified example, the amount of urea used comes to only 4% based on the starting amount of potato starch. The mixture, which is comprised of the starch, the phosphorylating agent and the urea, is heated for 3 hours to 95° C. in order to remove the water, and subsequently tempered for 3.5 hours at 150° C., in each case at a reduced pressure of below 7.5 kPa. Based on the contents of phosphorus of 0.31% by weight and nitrogen of 0.08% by weight, the degree of substitution for the phosphate ester groups achieved on the average amounts to below 0.02. The low amount of urea used exclusively serves the purpose of supporting the condensation reaction. The starch phosphate obtained following cooling is soluble in water within just a few seconds.

Furthermore, it is known also (Starch 43 [1991], No. 2, pages 66 to 69) that highly phosphorylated starches with degrees of substitution of about 1 are afflicted with the general drawback that they readily hydrolyze in humid air. The pastes of said starch, moreover, exhibit a lower viscosity than the starting starch.

Furthermore, their preparation requires the use of particularly aggressive phosphorylating agents such as phosphoroxy chloride, phosphorous pentoxide and organic, solvents, whereby the risk of massive formation of di- and tri-starch phosphate groups is posed (Houben-Weyl [1987], vol. 2/3, page 2164). With less aggressive phosphorylating agents such as, for example sodium phosphate, on the other hand, only low degrees of substitution of the starch are achieved.

SUMMARY OF THE INVENTION

The invention is based on the problem of providing starch phosphates that have a high degree of substitution; which are resistant to hydrolysis; and which can be produced by means of phosphorylating agents that have only low toxicity. Furthermore, the problem is to provide a suitable method for producing such starch phosphates.

Said problem is solved according to the invention by means of the features specified in the patent claim 18. The features required for carrying out the method are specified in claim 23. Suitable variations of the starch phosphates as well as of their production are specified in claims 19 and 22 and 24 to 29. Special applications of the starch phosphates as defined by the invention are the objects of claims 30 to 33.

By means of combined phosphorylation and carbamidation of the starting starch and the use of nontoxic phosphorylating agents, which are otherwise only employed for producing starch phosphates with low degrees of substitution, it has been possible to obtain highly substituted starch phosphates that are resistant to hydrolysis under normal conditions and exhibit excellent properties in terms of application technology. By means of varying the amounts of phosphoryling agents as well as of the urea used, and/or the reaction times, it is possible to produce starch phosphates with different degrees of substitution of greater than 0.01, preferably ranging from 0.1 to 1 both for the carbamide groups and the phosphate ester groups. Both pure amylopectin and also pure amylose as well as their native mixtures are suitable as starch or starch-containing materials. Mixtures with high starch contents such as flours of the various types of grain, and also pea and potato starches can be used as well. Furthermore, as starches with a slightly reduced molecular weight, so-called thin-dissolving starches as they are obtained by a careful acid treatment, are suitable as well; however, not suitable are dextrins that are produced by a high-degree of acid degradation of starches. Also the so-called soluble starches, i.e. starches soluble in cold water, which are produced by a thermal treatment of starches, can be employed as starting substances.

The urea to be used is not required to satisfy any special requirements; any technical urea quality is suitable. As phosphorylating agent, it is possible to use phosphoric acid of any desired technical quality, whereby the commercially available 85%-quality is particularly suited. When using more highly diluted acids, only more water has to be evaporated prior to the reaction. Instead of using phosphoric acid, it is possible also to employ ammonium phosphates, potassium phosphates or sodium phosphates, as well as mixtures of said phosphates. The use of said phosphates requires by 10 to 15° C. higher reaction temperatures as compared to phosphoric acid, but leads to the benefit that fewer starch degradation products are formed due to the lower content of $H^+$-ions. The reaction takes place under reduced pressure of below 13.3 kPa. The process of the carbamidation and phosphorylation reactions under vacuum takes place in a particularly careful manner, and at temperatures that are clearly lower than under normal pressure.

Based on the desired properties of the starch phosphates in terms of application technology, the degrees of, substitution of the carbamide groups and phosphate groups are within a range of greater than 0.01. The degrees of substitution are preferably in a range of from 0.1 to 1 because starch phosphates with a DS of the carbamide groups (DSC) of less than 0.1 have no shelf stability, and starch phosphates with a DS of the phosphate ester groups (DSP) of less than 0.1 are only inadequately expandable or soluble in cold water. Starch phosphates with a DSC or DSP of greater than 1 are poorly biodegradable.

Another substantial advantage offered by the procedure as defined by the invention consists in that starch phosphates with different properties are obtained through reactions carried out at different temperatures. Reaction temperatures of up to 110° C. supply starch phosphates that can be processed to homogeneous solutions. At reaction temperatures in excess of 120° C., starch phosphates are obtained that can be processed to suspensions of swollen particles with high water retention power, their properties being similar to those of the known super-absorbers.

The starch phosphates produced according to the procedure as defined by the invention are completely incombustible and biodegradable. The relatively high degrees of substitution of the phosphate ester and carbamide groups do not seem to have any adverse effect on the microbial degradation. The starch phosphates, which are homogeneously soluble in water, are particularly suited for use as components for adhesives and for regulating the viscosity of aqueous systems. The high concentration of ionogenic groups has a highly advantageous effect on the dispersion of solid particles.

The starch phosphates, which swell only in water, can be employed like the known super-absorbers as thickening agents, as additions to water for extinguishing fire, and because of their high absorptive capacity as an addition to or as the only component especially of hygienic articles.

Owing to the good biodegradability of the starch phosphates as defined by the invention, the products manufactured from such starch phosphates exhibit substantial superior qualities as compared to polyacrylate products.

Starch phosphates forming gels exhibit the property of exchanging cations and, to the extent they are dissolved homogeneously, are capable of forming complexes. Polyvalent metal ions, in particular heavy metal ions, but also agents supplying hardness are bonded in the process in a fixed manner. The gel-forming products are therefore particularly suited for bonding solutions containing heavy metals because the heavy metals remain fixed in the gel and are not washed out, for example by rain or the like. Gels and clear-dissolving products can be employed for softening water, for example as additives for detergents. The amounts of phosphate added in this way to the waste water are substantially lower than when using polyphosphates as water softeners.

DETAILED DESCRIPTION OF PREFERRED EMBODIMENTS

EXAMPLE 1

111.1 g corn starch with a starch content of 90% and an $H_2O$ content of 10% (Hylon VII of the firm National Starch & Chem. GmbH) is mixed with 22 ml water. 42.2 g of 85% phosphoric acid and 55.6 g urea is subsequently added under continuous stirring. The molar ratios of the anhydro-glucose units (AGU) of starch:phosphorus:urea amount to 1:0.59:1.48.

The resulting pasty mixture is dried at a temperature of 90° C. with application of a vacuum of from 3.3 to 4.6 kPa. In a reactor vessel, the mixture is subsequently heated to the required reaction temperatures of from 130 to 140° C. while maintaining the vacuum, for a duration of the reaction of 2 hours. A pasty product is obtained, which is solidified by cooling and subsequently crushed. Said product is purified by multiple slurrying with a methanol-water mixture (volume ratio 3:1) and subsequent aspiration. Final drying in a vacuum drying cabinet at 30 to 50° C. leads to 122.2 g of a mealy starch phosphate with a phosphorus content of 6.6% and a nitrogen content of 2.2%. The degrees of substitution (DSP's) for phosphate ester groups amount to 0.48 and the ones for carbamide come to DSC 0.35.

EXAMPLES 2 to 16

Starch phosphates are produced analogous to the procedure employed in example 1. The amounts of the starting products used and the process parameters are specified in the following tables.

TABLE 1

Starting starches

| Example No. | Type | Starch Content [amount in g] | Starch Content [%] | Content $H_2O$ [%] |
|---|---|---|---|---|
| 2 | Wheat starch | 112.4 | 89 | 11 |
| 3 | Corn starch | 111.1 | 90 | 10 |
| 4 | Potato starch | 116.3 | 86 | 14 |
| 5 | Wheat flour | 112.0 | 82 | 13 |
| 6 | Cold water-soluble starch | 113.6 | 88 | 12 |
| 7 | Wheat flour hydrolysate (thin-dissolving starch) | 120.5 | 83 | 12 |
| 8–16 | Wheat flour | 112.0 | 82 | 13 |

TABLE 2

$H_2O$ addition, phosphorylating agent, urea and molar Ratios

| Example No. | $H_2O$ addition [g] | Phosphorylating agent Type | Amount [g] | Molar ratio Urea [g] | AGU: P:U |
|---|---|---|---|---|---|
| 2 | | | 71.1 | 148.1 | 1:1:4 |
| 3 | | | 106.7 | 166.6 | 1:1.5:4 |
| 4 | 25 | $H_3PO_4$ | 42.7 | 77.8 | 1:0.6:2.1 |
| 5 | | 85% | 71.1 | 111.1 | 1:1:3 |
| 6 | | | 71.1 | 111.1 | 1:1:3 |
| 7 | | | 71.1 | 111.1 | 1:1:3 |
| 8 | 30 | $(NH_4)_2HPO_4$ | 65.2 | 88.9 | 1:0.8:2.4 |

TABLE 2-continued

H₂O addition, phosphorylating agent, urea and molar Ratios

| Example No. | H₂O addition [g] | Phosphorylating agent Type | Amount [g] | Urea [g] | Molar ratio AGU: P:U |
|---|---|---|---|---|---|
| 9 | 30 | NH₄H₂PO₄ | 28.4 | 44.4 | 1:0.4:1.2 |
| 10 | 20 | KH₂PO₄ | 25.2 | 27.8 | 1:0.3:0.75 |
| 11 | 40 | NaH₂PO₄ · H₂O | 17.0 | 148.1 | 1:0.2:4 |
| 12 | 50 | H₃PO₄, 85% | 7.1 | 13.0 | 1:01:0.35 |
| 13 | 30 | | 71.1 | 74.1 | 1:1:2.0 |
| 14 | 22 | H₃PO₄, 85% | 62.8 | 114.4 | 1:0.88:3.1 |
| 15 | 16 | | 47.0 | 85.8 | 1:066:2.3 |
| 16 | 11 | | 30.9 | 57.3 | 1:0.43:1.55 |

TABLE 3

Process parameters and results

| Example No. | Reaction Conditions Vacuum [kPa] | Temp. [° C.] | Duration [min] | Content P % | Content N % | Degrees of Substitution DSP | Degrees of Substitution DSC |
|---|---|---|---|---|---|---|---|
| 2 | 3.3–4.7 | 125 | | 8.9 | 4.6 | 0.82 | 0.93 |
| 3 | 4 | 135 | | 10.2 | 4.1 | 0.99 | 0.89 |
| 4 | 5.3 | 130 | 120 | 7.0 | 2.5 | 0.52 | 0.41 |
| 5 | 12–12.7 | 140 | | 9.1 | 4.6 | 0.85 | 0.95 |
| 6 | 5.3 | 125 | 90 | 8.5 | 3.2 | 0.71 | 0.60 |
| 7 | 4 | 122 | 90 | 8.4 | 2.9 | 0.69 | 0.52 |
| 8 | 4.7 | 140 | 60 | 6.5 | 3.7 | 0.50 | 0.63 |
| 9 | 2.7 | 140 | 120 | 7.4 | 3.9 | 0.61 | 0.71 |
| 10 | 2.7 | 135 | 120 | 3.3 | 2.5 | 0.21 | 0.35 |
| 11 | 2 | 140 | 180 | 2.1 | 6.3 | 0.15 | 0.98 |
| 12 | 1.3 | 135 | 90 | 1.7 | 0.95 | 0.10 | 0.12 |
| 13 | 2 | 140 | 180 | 9.8 | 0.84 | 0.79 | 0.15 |
| 14 | | 100 | | 8.0 | 1.0 | 0.59 | 0.17 |
| 15 | 2.7–4 | 110 | 180 | 6.9 | 0.78 | 0.48 | 0.12 |
| 16 | | 110 | | 5.8 | 1.0 | 0.39 | 0.15 |

In the synthesis according to the procedure proposed as defined by the invention, the resulting starch phosphates are collected in the form of ammonium salts of the phosphate esters. So that only the nitrogen bonded in the carbamide groups will be detected in the elementary analysis, the ammonium salts were converted into the corresponding sodium salts as follows: One sample of each of the resulting, purified starch phosphates was mixed with a slight excess of sodium carbonate and stirred with water until a suspension was formed. The respective mixture was evaporated in a vacuum rotation evaporator until complete dryness and subsequently mixed with water and evaporated again until the distillate was free of $NH_4^+$. The residue was slurried with water, mixed with glacial acetic acid up to a pH of about 6, and the product was precipitated with three times the volume of methanol. Thereafter, the product was aspirated and washed with a methanol-water mixture at a ratio of 3:1, and then dried in the vacuum drying cabinet at a temperature of 100° C. The elementary analysis was carried out on the sample present in the form of the $Na^+$ according to the method usually applied in practice.

The starch phosphates obtained according to examples 1 to 16 were tested with respect to their behavior in water and the water retention power was determined on the starch phosphates obtained in the form of gel.

With the starch phosphates collected in the form of a homogeneous solution, the viscosity of a 2.5% solution is determined by means of a rotation viscosimeter.

The water retention power is determined according to the following method: Excess water is poured over a specimen and following 30 minutes of swelling, the specimen is freed of the excess water by centrifuging it with a glass filter pan at about 3000 g. The specimen is subsequently dehydrated again in a vacuum drying cabinet at 100° C. The WRHV in % follows from WRHV=(mass specimen wet–mass specimen dry)×100/mass specimen dry.

The results of the behavior in water, the tests with respect to the WRHV and in regard to the viscosity are specified in the final table 4.

Furthermore, the biodegradability was tested on samples of starch phosphates obtained according to examples 5, 10, 12 and 13 according to the following method: the test is carried out based on the recommendations by the DECHEMA work circle "Umweltbiotechnologie-Bodenit" [Environmental Biotechnology-Soil] for testing the microbial structure of harmful substances in soil.

(1) Isolation of the Autochthonous Microorganisms 10 g of fresh compost is incubated in 100 ml 0.9% NaCl-solution for 30 minutes at 20° C. and 150 rpm. Following sedimentation of the soil particles, the supernatant liquid is canted and used as microorganism suspension.

Degradation Test 1 g of the sample is shaken up with 100 ml undiluted or 100 ml diluted 1:10 microorganism suspension and incubated in tightly sealed vessels at 20° C. as the standard culture. The decrease occurring in the volume of the gel is measured after a time duration of 14 days.

The results are specified in the final table 4.

TABLE 4

Test results on samples according to Examples 1 to 16

| Example No. | Behavior in water | WRHV % | Viscosity mPas | Decrease in gel volume [%] |
|---|---|---|---|---|
| 1 | formation of gel | 6000 | | |
| 2 | formation of gel | 6070 | | |
| 3 | formation of gel | 1274 | | |
| 4 | formation of gel | 2530 | | |
| 5 | formation of gel | 1360 | 100 | 30 |
| 6 | formation of gel | 4800 | | |
| 7 | formation of gel | 5620 | | |
| 8 | formation of gel | 3280 | | |
| 9 | formation of gel | 3450 | | |
| 10 | formation of gel | 2810 | 90 | 10 |
| 11 | formation of gel | 4760 | | |
| 12 | formation of gel | 1800 | 100 | 40 |
| 13 | formation of gel | 2300 | 100 | 30 |
| 14 | homogeneous solution | | 44 | |
| 15 | homogeneous solution | | 38 | |
| 16 | homogeneous solution | | 23 | |

What is claimed is:
1. Starch phosphates
   wherein the anhydroglucose units are substituted by phosphate ester groups and carbamide groups and the average degree of substitution DS of the carbamide groups and the phosphate ester groups is in each case in a range of 0.1 to 1.
2. The starch phosphates according to claim 1,
   wherein the starting starches are pure amylopectin or pure amylopectin or pure amylose or their native mixtures, or pea, potato or grain starches as well as thin-dissolving or cold water soluble starches.

3. The starch phosphates according to claim 1, wherein the phosphorylating agent is phosphoric acid and/or ammonium phosphate and/or potassium phosphate and/or sodium phosphate.

4. The starch phosphates according to claim 1, wherein the carbamidating agent is urea.

5. The starch phosphates according to claim 1, wherein the molar ratios of the anhydroglucose units of the starting starch:phosphorus of the phosphorylating agent:urea amount to 1:0.1 to 1.5:0.3 to 4.

6. A method for producing starch phosphates, by reacting starch or starch-containing starting materials with a phosphorylating agent with addition of urea, wherein the starting materials are used with a molar ratio of the anhydroglucose units of the starch:phosphorus of the phosphorylating agent:urea of 1:0.1 to 1.5:0.3 to 4; and that the reaction is carried out under vacuum at a pressure of $\leq 13.3$ kPa and at reaction temperatures of from 90° C. to 140° C., whereby the anhydroglucose units of the starting starch are substituted in the course of the reaction by phosphate ester groups and carbamide groups up to an average degree of substitution DS of 0.1 to 1 in each case.

7. The method according to claim 6, wherein the degrees of substitution (DS-values) of the carbamidation and phosphorylation are adjusted by varying the amounts of urea and/or of the phosphorylating agent used, and/or of the reaction times, whereby starch phosphates are obtained that form gels in water or are soluble homogeneously.

8. The method according to claim 6, wherein the duration of the reaction amounts to 60 minutes to 180 minutes.

9. The method according to claim 6, wherein the starting starch is mixed with water prior to the reaction, and the amounts of urea and phosphorylating agent used are subsequently added under constant stirring, and the pasty mixture is then heated for removing the water and dried.

10. The method according to claim 9, wherein drying is carried out under vacuum.

11. The method according to claim 9, wherein drying is carried out at temperature of up to 90° C.

12. The method according to claim 6, wherein a vacuum with a pressure of up to 6.7 kPa is applied.

* * * * *